United States Patent
Chan et al.

(10) Patent No.: US 11,947,519 B2
(45) Date of Patent: Apr. 2, 2024

(54) ASSIGNING AN ANOMALY LEVEL TO A NON-INSTRUMENTED OBJECT

(71) Applicant: International Business Machines Corporation, Armonk, NY (US)

(72) Inventors: Yuk L. Chan, Rochester, NY (US); Anuja Deedwaniya, Poughkeepsie, NY (US); Robert M. Abrams, Wappinger Falls, NY (US)

(73) Assignee: International Business Machines Corporation, Armonk, NY (US)

(*) Notice: Subject to any disclaimer, the term of this patent is extended or adjusted under 35 U.S.C. 154(b) by 99 days.

(21) Appl. No.: 17/120,338

(22) Filed: Dec. 14, 2020

(65) Prior Publication Data

US 2022/0188290 A1    Jun. 16, 2022

(51) Int. Cl.
*G06F 16/23* (2019.01)
*G06F 21/55* (2013.01)
*G06N 5/022* (2023.01)
*G06N 20/00* (2019.01)
*H04L 9/40* (2022.01)

(52) U.S. Cl.
CPC ......... *G06F 16/2365* (2019.01); *G06N 20/00* (2019.01); *H04L 63/1425* (2013.01)

(58) Field of Classification Search
CPC .. G06F 16/2365; G06F 21/552; G06F 21/554; G06N 20/00; G06N 5/022; H04L 63/1425
See application file for complete search history.

(56) References Cited

U.S. PATENT DOCUMENTS

| | | | |
|---|---|---|---|
| 10,454,753 B2 | 10/2019 | Sasturkar et al. | |
| 10,594,718 B1* | 3/2020 | Deaguero et al. | ....... G06N 5/04 |
| 11,153,339 B1 | 10/2021 | Kapoor et al. | |
| 11,190,534 B1 | 11/2021 | Shah et al. | |
| 11,573,954 B1 | 2/2023 | Cornell, Jr. et al. | |
| 2009/0322758 A1 | 12/2009 | Hillis et al. | |
| 2012/0041575 A1* | 2/2012 | Maeda | ................ G05B 23/024 |
| | | | 700/79 |
| 2014/0006325 A1 | 1/2014 | Biem | |
| 2014/0165201 A1* | 6/2014 | Wittenschlaeger | ......................... |
| | | | H04L 63/1425 |
| | | | 726/23 |
| 2015/0033086 A1 | 1/2015 | Sasturkar et al. | |
| 2016/0065604 A1* | 3/2016 | Chen | ................... G06F 21/6227 |
| | | | 726/23 |

(Continued)

OTHER PUBLICATIONS

Chan et al.; "Anomaly Detection With Impact Assessment"; U.S. Appl. No. 17/120,333, filed Dec. 14, 2020.

(Continued)

*Primary Examiner* — Dennis Truong
(74) *Attorney, Agent, or Firm* — CANTOR COLBURN LLP; Teddi Maranzano

(57) ABSTRACT

Examples described herein provide a computer-implemented method that includes defining a key performance indicator associated with a non-instrumented object of a processing system. The method further includes determining a current anomaly level of the key performance indicator for an instrumented object having a relationship with the non-instrumented object. The method further includes assigning an anomaly level to the non-instrumented object based on the current anomaly level.

14 Claims, 7 Drawing Sheets

(56) References Cited

U.S. PATENT DOCUMENTS

| | | | |
|---|---|---|---|
| 2016/0217022 A1 | 7/2016 | Velipasaoglu et al. | |
| 2016/0219066 A1 | 7/2016 | Vasseur et al. | |
| 2017/0005954 A1 | 1/2017 | Shaltiel et al. | |
| 2017/0063910 A1 | 3/2017 | Muddu et al. | |
| 2017/0124502 A1* | 5/2017 | Brew | H04L 67/303 |
| 2017/0142140 A1 | 5/2017 | Muddu et al. | |
| 2018/0307994 A1 | 10/2018 | Cheng et al. | |
| 2018/0336353 A1 | 11/2018 | Manadhata et al. | |
| 2019/0124104 A1 | 4/2019 | Apostolopoulos | |
| 2019/0182119 A1 | 6/2019 | Ratkovic et al. | |
| 2019/0372827 A1 | 12/2019 | Vasseur et al. | |
| 2020/0216097 A1 | 7/2020 | Galula et al. | |
| 2020/0252310 A1* | 8/2020 | Thampy | H04L 43/04 |
| 2020/0285997 A1* | 9/2020 | Bhattacharyya | G06N 7/00 |
| 2020/0287927 A1 | 9/2020 | Zadeh et al. | |
| 2020/0351283 A1* | 11/2020 | Salunke | H04L 63/1425 |
| 2021/0065245 A1 | 3/2021 | Resheff et al. | |
| 2021/0203576 A1* | 7/2021 | Padfield | H04L 43/04 |
| 2022/0188424 A1 | 6/2022 | Chan et al. | |
| 2022/0191226 A1 | 6/2022 | Chan et al. | |
| 2022/0303168 A1* | 9/2022 | Mdini | H04L 43/16 |

OTHER PUBLICATIONS

Chan et al.; "Aggregating Results From Multiple Anomaly Detection Engines"; U.S. Appl. No. 17/120,335, filed Dec. 14, 2020.
List of IBM Patents or Patent Applications Treated as Related; Appendix P Filed Jan. 6, 2021; 2 Pages.

* cited by examiner

ASSIGNING AN ANOMALY LEVEL TO A NON-INSTRUMENTED OBJECT

BACKGROUND

Embodiments described herein generally relate to processing systems, and more specifically, to assigning an anomaly level to a non-instrumented object.

Anomaly detection is the process of identifying data points from a data set that are considered outliers or otherwise fall outside some expected or desired range. As an example, in the case of information technology (IT) data, IT data can be collected from connected processing systems and/or components (or "objects") of the processing systems. The IT data can then be analyzed using anomaly detection techniques to determine whether an anomaly has occurred within the processing systems and/or the components of the processing systems. Discovery of anomalies is useful for diagnostic or proactive alerting. Diagnostics includes identifying the root cause or next step related to problems to enable the problems to be addressed proactively. Proactive alerting includes generating an alert or event based on a detected anomaly for a potential problem.

SUMMARY

Embodiments of the present invention are directed to assigning an anomaly level to a non-instrumented object.

A non-limiting example computer-implemented method includes defining a key performance indicator associated with a non-instrumented object of a processing system. The method further includes determining a current anomaly level of the key performance indicator for an instrumented object having a relationship with the non-instrumented object. The method further includes assigning an anomaly level to the non-instrumented object based on the current anomaly level.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the scope of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide for assigning an anomaly level to a non-instrumented object. Anomaly detection is useful for identifying the root cause of problems to enable the problems to be addressed proactively.

There are many anomaly detection engines available for analyzing information technology (IT) data. Anomaly detection is often applied to objects that are instrumented. Instrumented objects have log data or metrics associated therewith that can be analyzed, such as by an anomaly detection engine. However, some objects in an IT environment are not instrumented. That is, these non-instrumented objects do not have log data or metrics available for analysis. As a result, non-instrumented objects are largely ignored during anomaly detection and high-level system analysis.

Figure 1A:
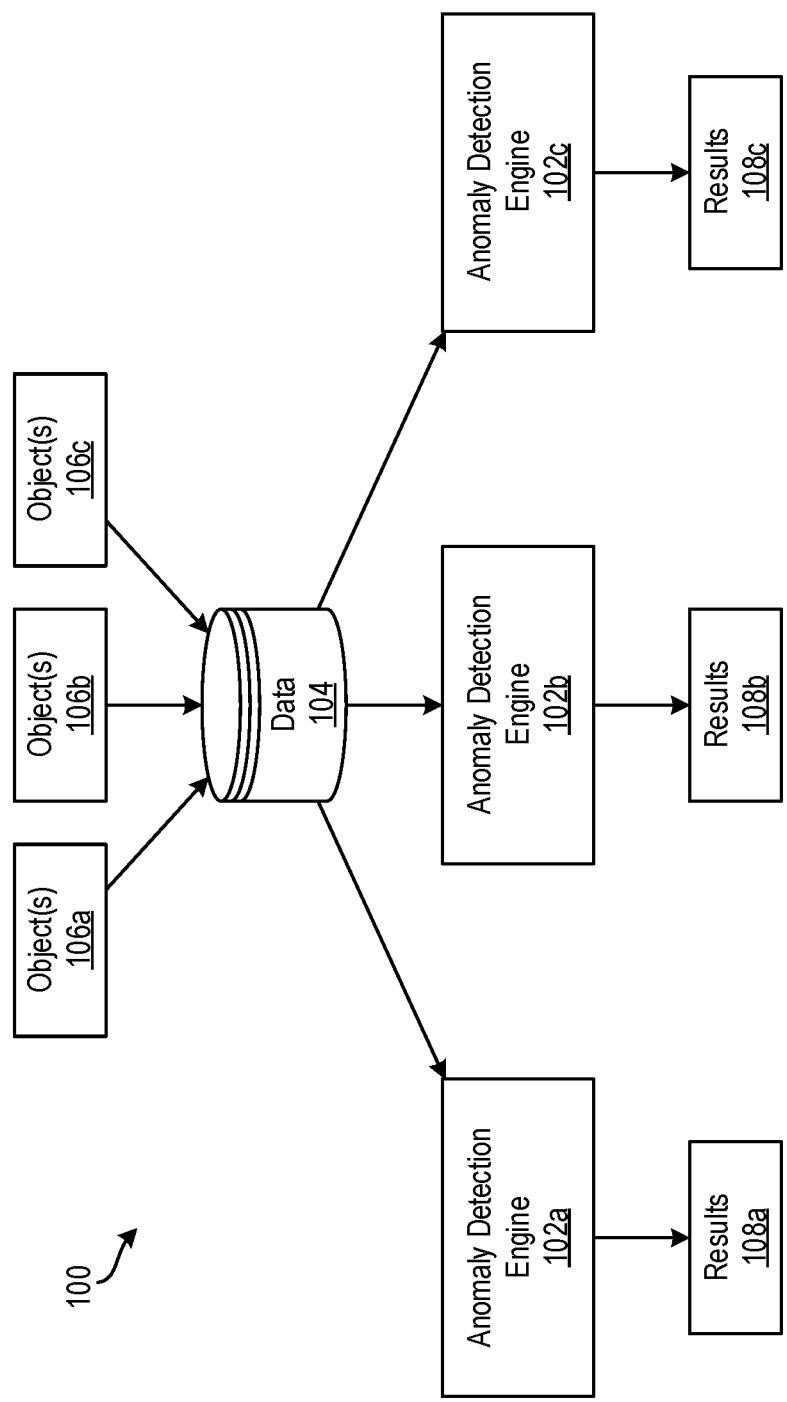
FIG. 1A depicts a block diagram of a system of anomaly detection engines.

FIG. 1A depicts an example of a system 100 of anomaly detection engines 102a, 102b, 102c (collectively referred to as "anomaly detection engines 102") that analyze data 104. The data 104 are collected from instrumented objects 106a, 106b, 106c (collectively referred to as "instrumented objects 106"). The instrumented objects can be networks, memory devices, processing devices, applications, etc. The anomaly detection engines 102 use different anomaly detection algorithms to generate results 108a, 108b, 108c (collectively referred to as "results 108"). However, objects that are non-instrumented are largely ignored during anomaly detection and high-level system analysis.

The techniques described herein address one or more the shortcomings of the prior art by providing a mechanism to assign an anomaly level to a non-instrumented object. To do this, one or more embodiments of the present invention superimpose anomaly detection information on an object (e.g., a resource, a physical component, a logical component, etc.) relationship graph (see, e.g., the relationship graph 200 of FIG. 2). The relationship graph can be discovered or manually defined by a subject matter expert. The relationship graph includes instrumented objects with available log data or metrics as well as non-instrumented components for which no such log data or metrics are available. Accordingly, anomaly detection cannot be performed directly on the non-instrumented objects.

However, by traversing the relationship graph, non-instrumented components associated with instrumented components can be identified. Examples of non-instrumented components include direct-access storage devices (DASD), address space level interdependent operating system components, system/middleware products, etc. Once identified, the non-instrumented components can be analyzed for anomaly detection using a key performance indicator (KPI) or multiple KPIs. The anomaly level at the analyzed (instrumented) object can imply changes of the non-instrumented object being a contributor to a problem (anomaly). Thus, the anomaly level that is assigned to a non-instrumented object can be used to trigger new or additional diagnostics or analysis.

Figure 1B:
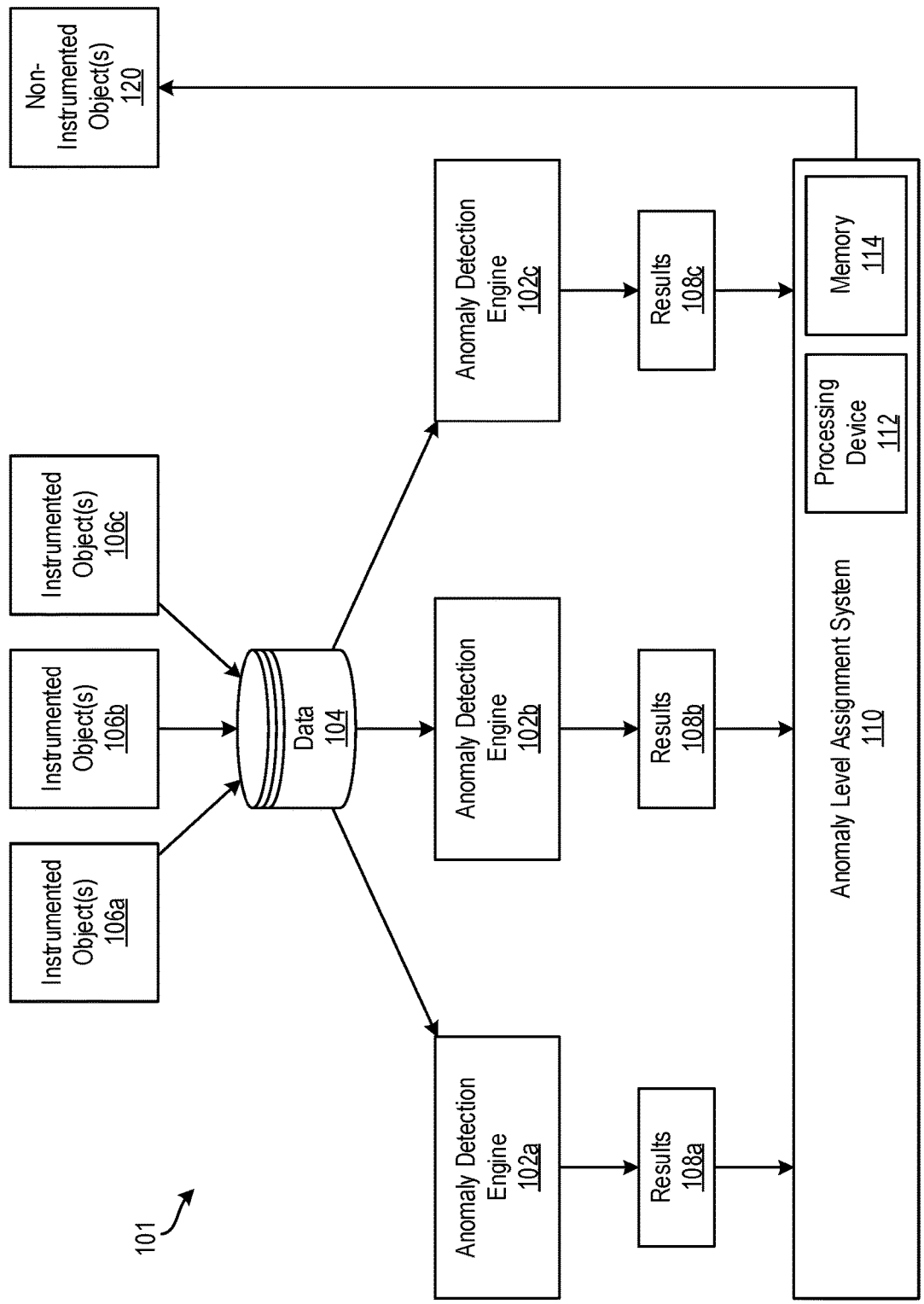
FIG. 1B depicts a block diagram of a system including an anomaly level assignment system for assigning an anomaly level to a non-instrumented object according to one or more embodiments described herein.

Turning now to FIG. 1B, an example of a system 101 including an anomaly level assignment system 110 for assigning an anomaly level to a non-instrumented object is depicted according to one or more embodiments described herein. The features and functionality of the anomaly detection aggregation system 110, described in more detail herein, can be implemented as instructions stored on a computer-readable storage medium, as hardware modules, as special-purpose hardware (e.g., application specific hardware, application specific integrated circuits (ASICs), application specific special processors (ASSPs), field programmable gate arrays (FPGAs), as embedded controllers, hardwired circuitry, etc.), or as some combination or combinations of these. According to aspects of the present disclosure, the features and functionality of the anomaly detection aggregation system 110 can be a combination of hardware and programming. The programming can be processor executable instructions stored on a tangible memory, and the hardware can include a processing device 112 for executing those instructions. Thus a memory 114 can store program instructions that when executed by the processing device 112 implement the features and functionality described herein.

The anomaly level assignment system 110 uses results (e.g., the results 108) of anomaly detection performed on instrumented objects 106 to assign an anomaly level to a non-instrumented object 120. The relationship between the instrumented objects 106 and the non-instrumented object 120 can be referred to as a "far" relationship because the anomaly level for the non-instrumented object 120 is being assigned based on anomaly information about other, instrumented objects (e.g., the instrumented objects 106) using data (e.g., the data 104) about the instrumented objects and/or results (e.g., the results 108) generated by anomaly detection engines (e.g., the anomaly detection engines 102) using the data (e.g., the data 104) about the instrumented objects.

This approach enables the anomaly level assignment system 110 to apply the knowledge of the instrumented object 106 to the related non-instrumented object 120. Further, the anomaly level assignment system 110 can calculate a confidence score of the anomaly level based on the relationships between the instrumented objects 106 and the non-instrumented object 120. For example, the confidence score increases as the number of relationships between the instrumented objects 106 and the non-instrumented object 120 increases.

The features and functionality of the anomaly level assignment system 110 are now described in more detail with reference to FIGS. 2 and 3.

Figure 2:
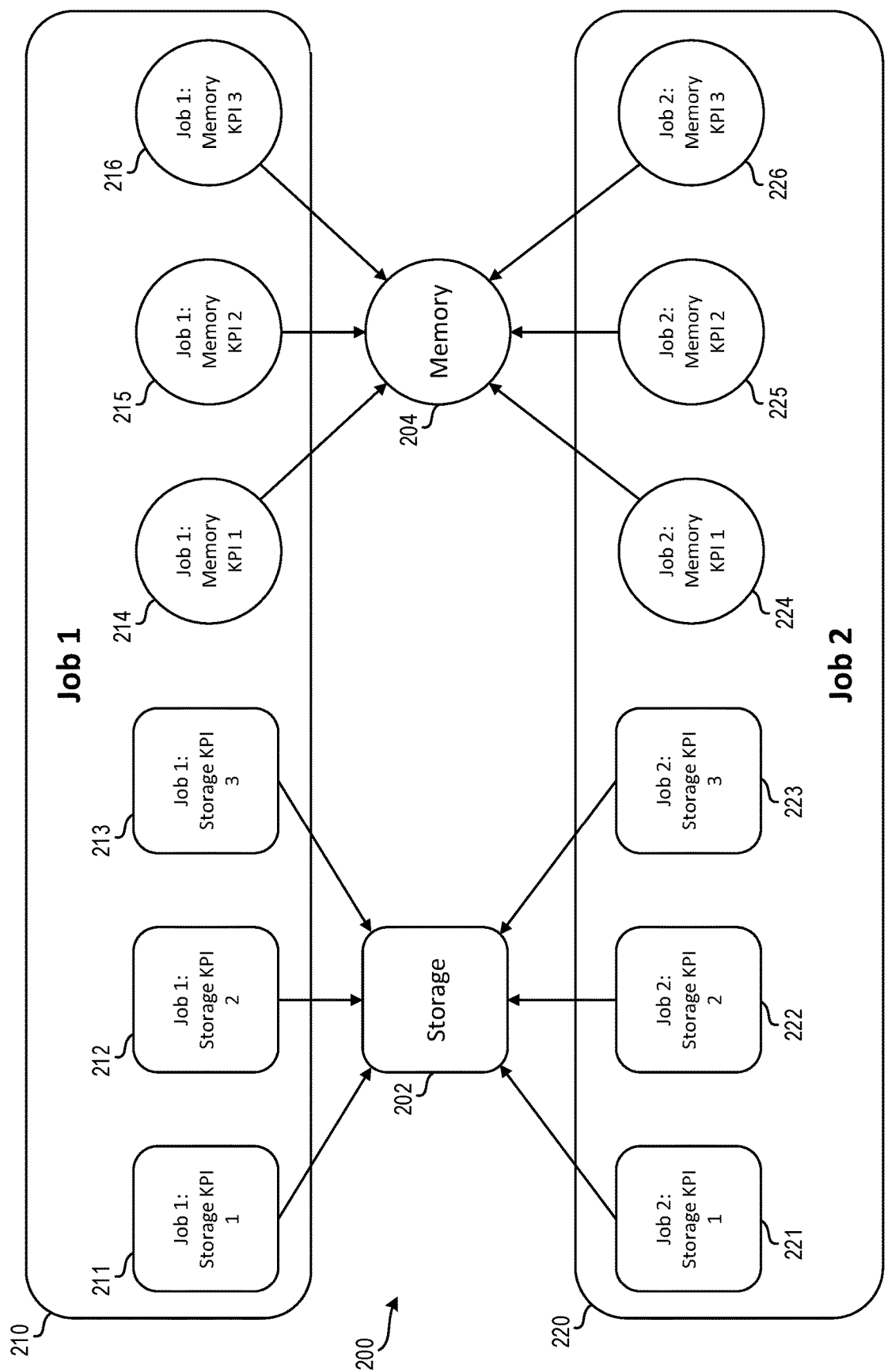
FIG. 2 depicts block diagram of a relationship graph having instrumented objects and non-instrumented objects according to one or more embodiments described herein.

FIG. 2 depicts a block diagram of a relationship graph 200 having instrumented objects and non-instrumented objects according to one or more embodiments described herein. In particular, the relationship graph 200 includes two jobs: job1 210 and job2 220, which are instrumented objects. As described herein, the instrumented objects, such as job1 210 and job2 220, have log data or metrics (e.g., system management facilities (SMF) data) associated therewith that can be analyzed, such as by an anomaly detection engine. Such log data or metrics are depicted in FIG. 2 as KPIs. Particularly, job1 210 includes storage KPIs 211, 212, 213 and memory KPIs 214, 215, 216. Similarly, job2 220 includes storage KPIs 221, 222, 223 and memory KPIs 224, 225, 226.

The relationship graph 200 also includes two non-instrumented objects: storage 202 and memory 204. For these non-instrumented objects, log data or metrics (e.g., system management facilities (SMF) data) are unavailable. Non-instrumented objects can be networks, memory devices, processing devices, applications, etc. Examples of non-instrumented components include DASD, address space level interdependent operating system components, system/middleware products, network interface card, central processor unit, router, device driver, etc.

The anomaly level assignment system 110 uses the available log data or metrics for instrumented objects to generate an anomaly level for a non-instrumented object, such as the storage 202 and/or the memory 204. For example, the anomaly level assignment system 110 uses the storage KPIs 211, 212, 213 from job1 210 and/or the storage KPIs 221, 222, 223 from job2 220 to generate an anomaly level for storage 202. Similarly, the anomaly level assignment system 110 uses the memory KPIs 214, 215, 216 from job1 210 and/or the memory KPIs 224, 225, 226 from job2 220 to generate an anomaly level for memory 204. The anomaly level generated by the anomaly level assignment system 110 can then be used as an input for other analytics (e.g., should a job be submitted that has a dependency on the non-instrumented object?). In some examples, the anomaly detection information can be superimposed on a resource/physical component/logical component relationship graph, such as the relationship graph 200.

Figure 3:
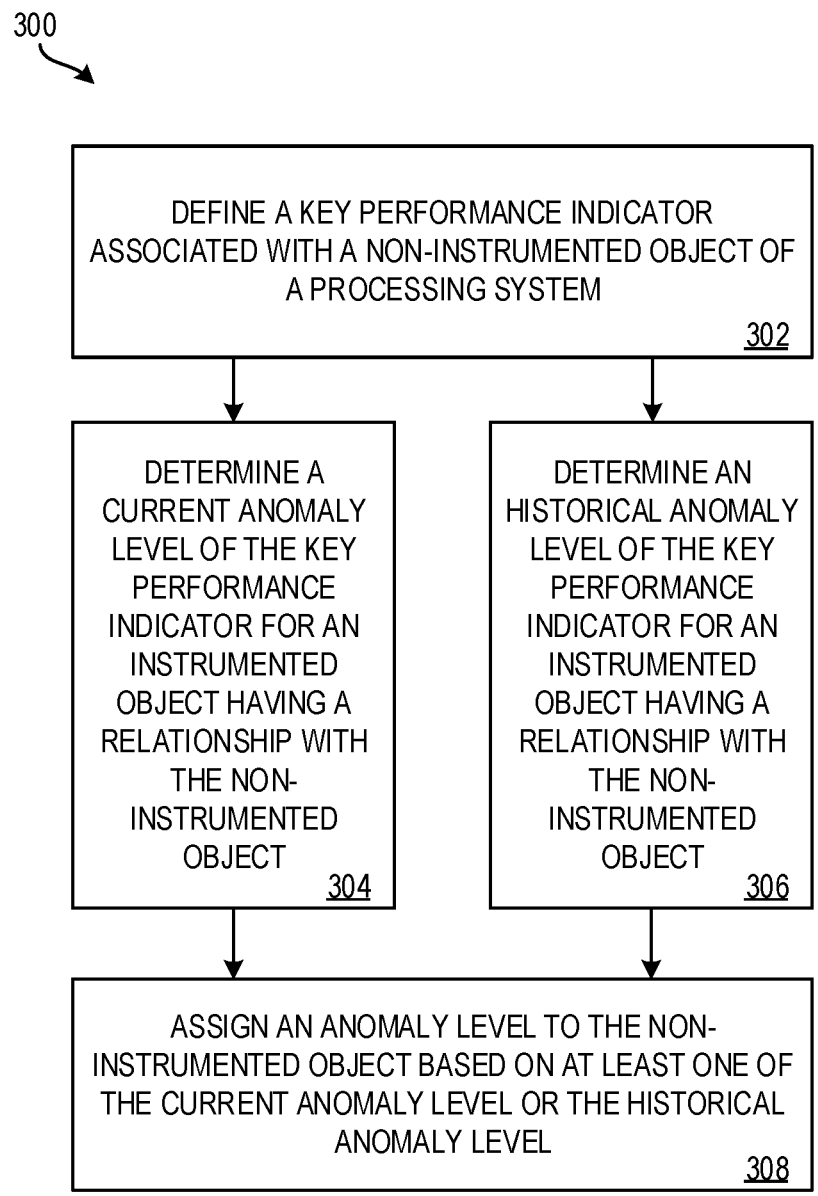
FIG. 3 depicts a flow diagram of a method for assigning an anomaly level to a non-instrumented object according to one or more embodiments described herein.

FIG. 3 depicts a flow diagram of a method 300 for assigning an anomaly level to a non-instrumented object according to one or more embodiments described herein. The method 300 can be implemented using any suitable system (e.g., the anomaly level assignment system 110, the processing system 600 of FIG. 6, etc.) and/or any suitable device (e.g., the processing device 112, one or more of the processors 621a, 621b, 621c of FIG. 6, etc.).

At block 302, a key performance indicator is defined. The KPI is associated with a non-instrumented object of a processing system. A key performance indicator is an indicator of advancement towards a desired outcome. KPIs can be used to develop meaningful data about activities or initiatives in a way that all stakeholders understand. Regarding a memory, examples of KPIs could include available physical memory, available virtual memory, number of bad sectors, percentage of bad sectors, number of read/write errors, percentage of read/write errors, etc. It should be appreciated that, at block 302, one or more KPIs can be defined for the non-instrumented object.

At block 304, the anomaly level assignment system 110 determines a current anomaly level with respect to the key performance indicator for an instrumented object having a relationship with the non-instrumented object. For example, the anomaly level assignment system 110 looks to one or more instrumented objects related to the non-instrumented object. In the relationship graph 200 of FIG. 2, for example, the anomaly level assignment system 110 receives the current anomaly level of the KPIs associated with the respective KPIs for storage 202 and memory 204 in job1 210 and job2 220. In some examples, the current anomaly level is the actual value of the KPI; however, in some examples, the current anomaly level is a rate, volume, occurrence, absence, etc. of the KPI.

At block 306, the anomaly level assignment system 110 determines an historical anomaly level of the key performance indicator for an instrumented object having a relationship with the non-instrumented object. For example, the anomaly level assignment system 110 can monitor, over some period of time, the KPIs associated with instrumented objects to determine the historical anomaly level.

It should be appreciated that the blocks 204 and 206 can be performed simultaneously, concurrently, serially, or in any other suitable order or arrangement.

At block 308, the anomaly level assignment system 110 assigns an anomaly level to the object based on at least one of the current anomaly level and the historical anomaly level. The anomaly level assigned to the object is calculated, for example, using a weight average approach or another suitable statistical technique. The weighted average approach can calculate the anomaly level by multiplying, for each KPI, a weight of a KPI by an anomaly level for that KPI, summing the results, and then dividing the summation by a sum of the weights for the KPIs. For example, consider the following equation $$(weight(R1)*anomaly(R1)+weight(R2)*anomaly(R2)+weight(R3)*anomaly(R3)+ \ldots )/\Sigma \text{ weight}(n)$$

where R1 is a first KPI, R2 is a second KPI, R3 is a third KPI, and n is the number of KPIs.

In some examples, for each type of non-instrumented object (e.g., a memory, a storage device, etc.), the anomaly level assignment system 110 normalizes the anomaly level. For example, the anomaly level for each type of non-instrumented object can be normalized to a scale of 0-10, a scale of 0-100, or another suitable scale. This prevents the KPI-specific characteristics from influencing the rankings of anomaly levels across the non-instrumented components. In an example, the anomaly level is assigned using a machine learning classifier. In another example, the anomaly level is assigned using healthy data for the object (e.g., data known to be without anomalies).

The anomaly level assigned by the anomaly level assignment system 110 can be used in a number of ways. For example, the anomaly level can be used to determine whether a high importance job should be submitted with a dependency of a highly abnormal object. As another example, the anomaly level can be used to trigger diagnostics of the non-instrumented object. As yet another example, the anomaly level can be used to determine trending of the object (e.g., is the object trending towards an increased anomaly?). As yet another example, the anomaly level can be used to schedule jobs based on their dependency level on a component with a detected abnormality (i.e., an anomaly level above a certain threshold). For example, a particular job might have less dependency on memory, which has a detected abnormality (i.e., an anomaly level above a certain threshold); therefore, that job can be scheduled because it will not be as taxing on the memory while a job that is more taxing on the memory may be delayed.

Consider the following use case: the determination of abnormal contention among CICS regions of a customer information control system (CICS) and the corresponding data managers, like DB2 or VSAM RLS. The individual components have isolated views of data that could contribute to a consolidated contention view at the operating system level (as opposed to post-processing utilities). "Superimposing" the interrelationships can result in providing guidance to the administrator in terms of what elements may be involved to refer the problem to the appropriate subject matter expert (SME). Otherwise, the SMEs tend to be isolated, unaware of how a workload got to them.

Additional processes also may be included. For example, the anomaly level assignment system 110 can determine whether the overall anomaly score for the at least one of the nodes exceeds a threshold. The threshold can be predetermined, can be automatically set by the anomaly detection aggregation system 110, can be learned over time by the anomaly detection aggregation system 110 (e.g., using machine learning techniques), can be based on historical data, can be manually set/adjusted by a system administrator, and/or combinations thereof. Then, responsive to determining that the overall anomaly score for the at least one of the nodes exceeds the threshold, the anomaly detection aggregation system 110 can cause an action to be taken to remedy an anomaly associated with the overall anomaly score that exceeds the threshold.

It should be understood that the process depicted in FIG. 3 represents an illustration, and that other processes may be added or existing processes may be removed, modified, or rearranged without departing from the scope of the present disclosure.

Example embodiments of the disclosure include or yield various technical features, technical effects, and/or improvements to technology. Example embodiments of the disclosure provide an anomaly level assignment system configured to determine current and historical anomaly levels of KPIs for an instrumented object having a relationship with a non-instrumented object and further configured to assign an anomaly level to the non-instrumented object based on at least one of the current anomaly level or the historical anomaly level. These aspects of the disclosure constitute technical features that yield the technical effect of proactive identification and correction of problems within a system. For example, non-instrumented objects for which data is otherwise unavailable can be analyzed using anomaly detection techniques for KPIs of related instrumented objects. As a result of these technical features and technical effects, an anomaly level assignment system in accordance with example embodiments of the disclosure represents an improvement to existing anomaly detection techniques. It should be appreciated that the above examples of technical features, technical effects, and improvements to technology of example embodiments of the disclosure are merely illustrative and not exhaustive.

It is to be understood that, although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
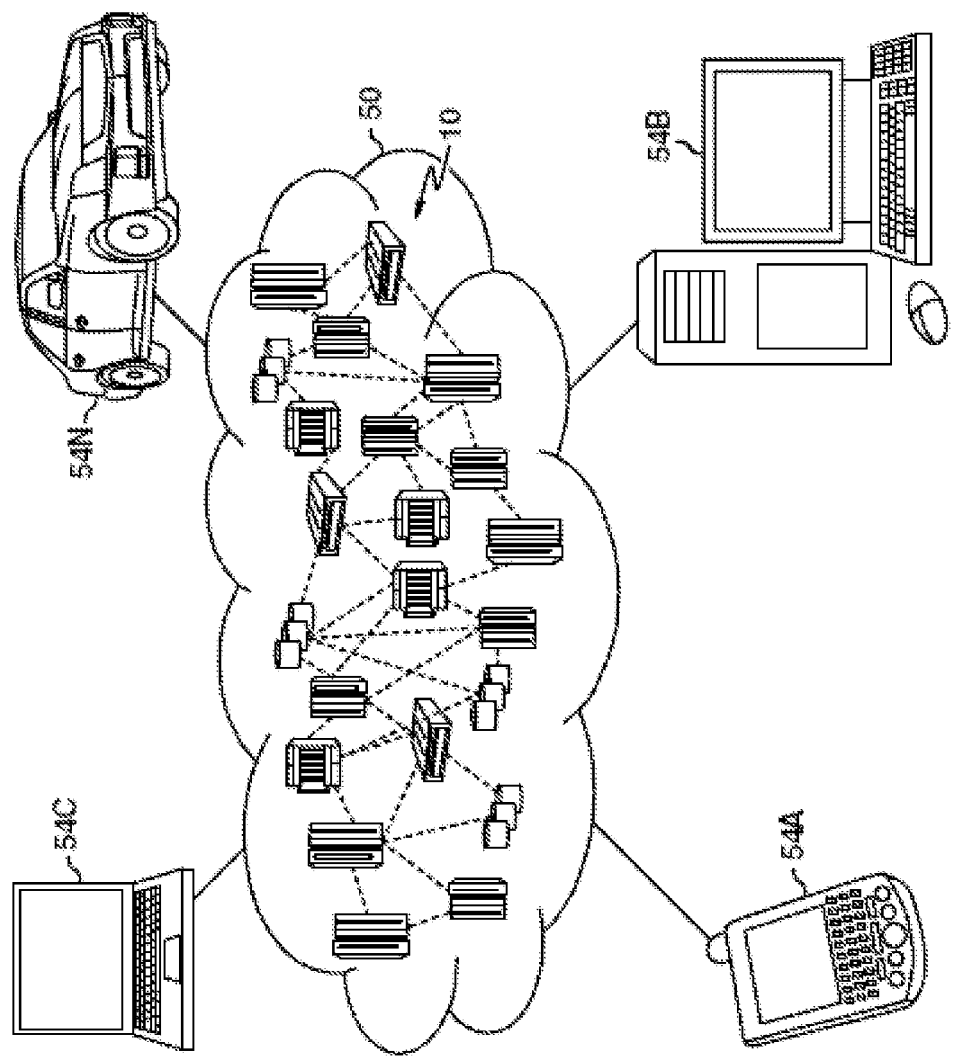
FIG. 4 depicts a cloud computing environment according to one or more embodiments described herein.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
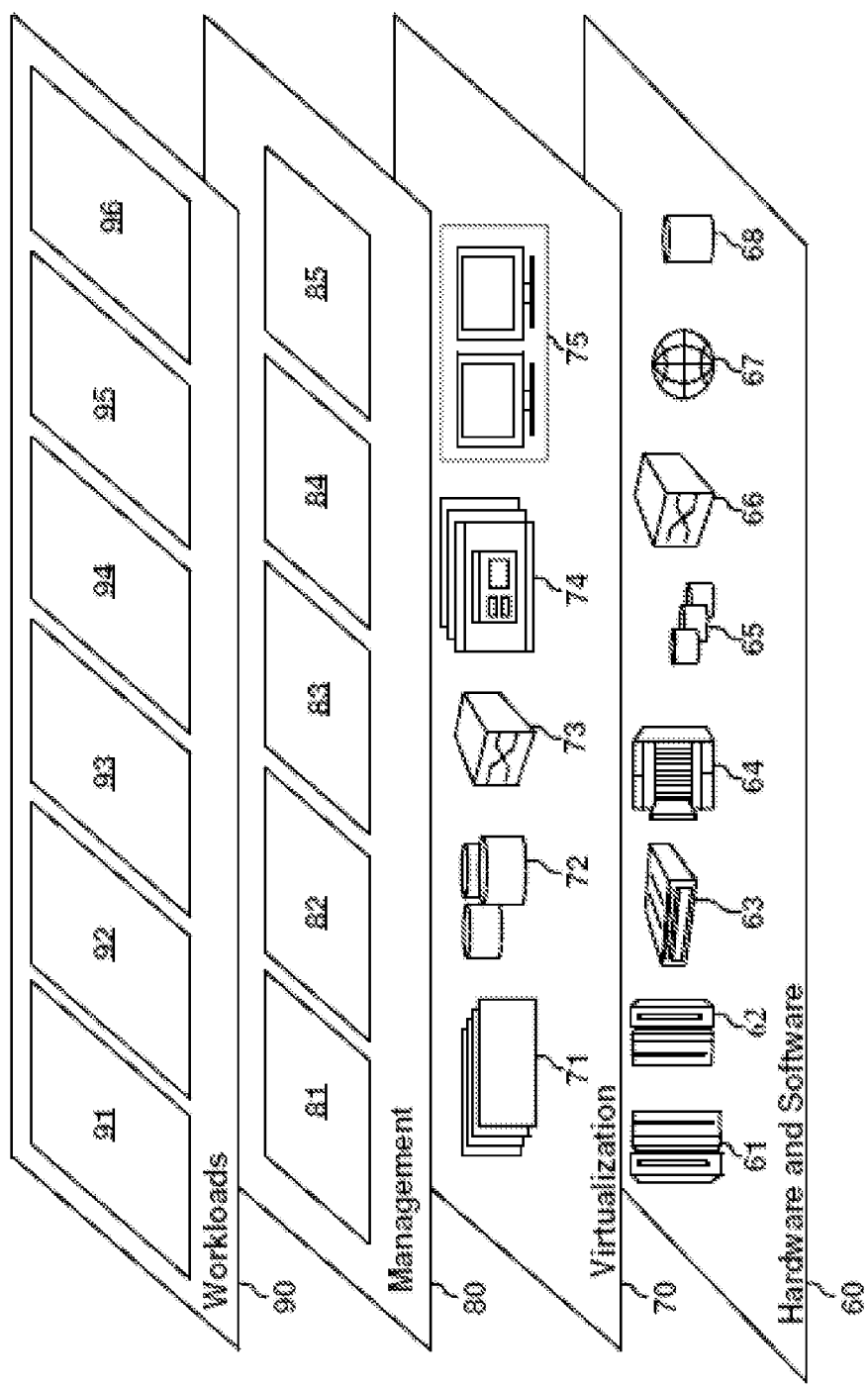
FIG. 5 depicts abstraction model layers according to one or more embodiments described herein.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96.

Figure 6:
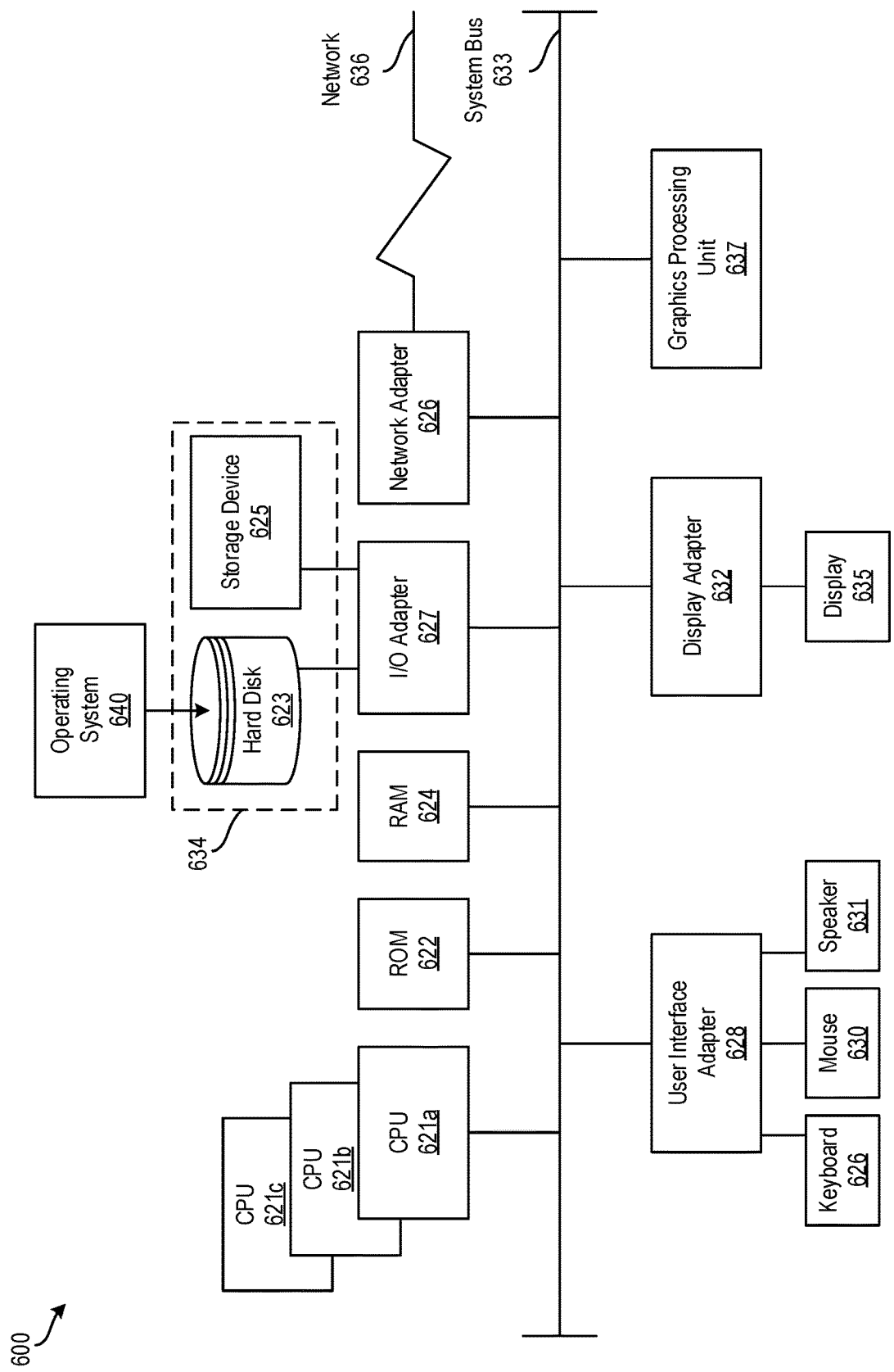
FIG. 6 depicts a block diagram of a processing system for implementing the presently described techniques according to one or more embodiments described herein.

It is understood that one or more embodiments described herein is capable of being implemented in conjunction with any other type of computing environment now known or later developed. For example, FIG. 6 depicts a block diagram of a processing system 600 for implementing the techniques described herein. In accordance with one or more embodiments described herein, the processing system 600 is an example of a cloud computing node 10 of FIG. 4. In examples, processing system 600 has one or more central processing units ("processors" or "processing resources") 621a, 621b, 621c, etc. (collectively or generically referred to as processor(s) 621 and/or as processing device(s)). In aspects of the present disclosure, each processor 621 can include a reduced instruction set computer (RISC) microprocessor. Processors 621 are coupled to system memory (e.g., random access memory (RAM) 624) and various other components via a system bus 633. Read only memory (ROM) 622 is coupled to system bus 633 and may include a basic input/output system (BIOS), which controls certain basic functions of processing system 600.

Further depicted are an input/output (I/O) adapter 627 and a network adapter 626 coupled to system bus 633. I/O adapter 627 may be a small computer system interface (SCSI) adapter that communicates with a hard disk 623 and/or a storage device 625 or any other similar component. I/O adapter 627, hard disk 623, and storage device 625 are collectively referred to herein as mass storage 634. Operating system 640 for execution on processing system 600 may be stored in mass storage 634. The network adapter 626 interconnects system bus 633 with an outside network 636 enabling processing system 600 to communicate with other such systems.

A display (e.g., a display monitor) 635 is connected to system bus 633 by display adapter 632, which may include a graphics adapter to improve the performance of graphics intensive applications and a video controller. In one aspect of the present disclosure, adapters 626, 627, and/or 632 may be connected to one or more I/O busses that are connected to system bus 633 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 633 via user interface adapter 628 and display adapter 632. A keyboard 629, mouse 630, and speaker 631 may be interconnected to system bus 633 via user interface adapter 628, which may include, for example, a Super I/O chip integrating multiple device adapters into a single integrated circuit.

In some aspects of the present disclosure, processing system 600 includes a graphics processing unit 637. Graphics processing unit 637 is a specialized electronic circuit designed to manipulate and alter memory to accelerate the creation of images in a frame buffer intended for output to a display. In general, graphics processing unit 637 is very efficient at manipulating computer graphics and image processing, and has a highly parallel structure that makes it more effective than general-purpose CPUs for algorithms where processing of large blocks of data is done in parallel.

Thus, as configured herein, processing system 600 includes processing capability in the form of processors 621, storage capability including system memory (e.g., RAM 624), and mass storage 634, input means such as keyboard 629 and mouse 630, and output capability including speaker 631 and display 635. In some aspects of the present disclosure, a portion of system memory (e.g., RAM 624) and mass storage 634 collectively store the operating system 640 such as the AIX® operating system from IBM Corporation to coordinate the functions of the various components shown in processing system 600. Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
defining a key performance indicator associated with a non-instrumented object of a processing system, wherein the non-instrumented object comprises an object of the processing system that does not have log data or metrics available for analysis;
determining, by a processing device, a current anomaly level for each of a plurality of key performance indicators for an instrumented object having a relationship with the non-instrumented object, wherein the instrumented object comprises another object of the processing system that has at least one of log data and metrics available for analysis;
assigning, by the processing device, an anomaly level to the non-instrumented object based on the current anomaly levels of the instrumented object, the anomaly level comprising a weighted function of the respective anomaly level of each of the plurality of key performance indicators, wherein each anomaly level is uniquely weighted;
for each type of non-instrumented object, normalizing the anomaly level for the respective type of non-instrumented object to a respective fixed scale, thus preventing key performance indicator-specific characteristics from influencing rankings of anomaly levels across non-instrumented components;
calculating, by the processing device, a confidence score for the anomaly level based at least in part on the relationship between the non-instrumented object and the instrumented object and based at least in part on a relationship between the non-instrumented object and other instrumented objects, wherein the confidence score is further based at least in part on a number of the relationships between the non-instrumented object and other instrumented objects; and
assigning the confidence score to the anomaly level assigned to the non-instrumented object.

2. The computer-implemented method of claim 1, further comprising:
determining whether the anomaly level for the non-instrumented object exceeds a threshold.

3. The computer-implemented method of claim 2, further comprising:
responsive to determining that the anomaly level for the object exceeds the threshold, causing, by the processing device, an action to be taken to remedy at least one anomaly associated with the object.

4. The computer-implemented method of claim 1, wherein assigning the anomaly level to the object is performed using a machine learning classifier.

5. The computer-implemented method of claim 1, further comprising:
identifying, by the processing device, the relationship between the non-instrumented object and the instrumented object.

6. The computer-implemented method of claim 1, wherein the an anomaly level assigned to the object is calculated based on a weighted average.

7. The computer-implemented method of claim 1, further comprising:
determining, by the processing device, a historical anomaly level of the key performance indicator for the instrumented object having the relationship with the non-instrumented object.

8. The computer-implemented method of claim 7, wherein assigning the anomaly level to the non-instrumented object based on the current anomaly level and the historical anomaly level.

9. A system comprising:
a memory comprising computer readable instructions; and a processing device for executing the computer readable instructions, the computer readable instructions controlling the processing device to perform operations comprising:
defining a key performance indicator associated with a non-instrumented object of a processing system, wherein the non-instrumented object comprises an object of the processing system that does not have log data or metrics available for analysis;
determining a current anomaly level for each of a plurality of key performance indicators for an instrumented object having a relationship with the non-instrumented object, wherein the instrumented object comprises another object of the processing system that has at least one of log data and metrics available for analysis;
assigning an anomaly level to the non-instrumented object based on the current anomaly levels of the instrumented object, the anomaly level comprising a weighted function of the respective anomaly level of each of the plurality of key performance indicators, wherein each anomaly level is uniquely weighted;
for each type of non-instrumented object, normalizing the anomaly level for the respective type of non-instrumented object to a respective fixed scale, thus preventing key performance indicator-specific characteristics from influencing rankings of anomaly levels across non-instrumented components;
calculating, by the processing device, a confidence score for the anomaly level based at least in part on the relationship between the non-instrumented object and the instrumented object and based at least in part on a relationship between the non-instrumented object and other instrumented objects, wherein the confidence score is further based at least in part on a number of the relationships between the non-instrumented object and other instrumented objects; and
assigning the confidence score to the anomaly level assigned to the non-instrumented object.

10. The system of claim 9, wherein the operations further comprise:
determining whether the anomaly level for the non-instrumented object exceeds a threshold.

11. The system of claim 10, wherein the operations further comprise:
responsive to determining that the anomaly level for the object exceeds the threshold, causing, by the processing device, an action to be taken to remedy at least one anomaly associated with the object.

12. The system of claim 9, wherein assigning the anomaly level to the object is performed using a machine learning classifier.

13. The system of claim 9, wherein the operations further comprise:
   identifying, by the processing device, the relationship between the non-instrumented object and the instrumented object.

14. A computer program product comprising a computer readable storage medium having program instructions embodied therewith, the program instructions executable by a processor to cause the processor to perform operations comprising:
   defining a key performance indicator associated with a non-instrumented object of a processing system, wherein the non-instrumented object comprises an object of the processing system that does not have log data or metrics available for analysis;
   determining a current anomaly level for each of a plurality of key performance indicators for an instrumented object having a relationship with the non-instrumented object, wherein the instrumented object comprises another object of the processing system that has at least one of log data and metrics available for analysis;
   assigning an anomaly level to the non-instrumented object based on the current anomaly levels of the instrumented object, the anomaly level comprising a weighted function of the respective anomaly level of each of the plurality of key performance indicators, wherein each anomaly level is uniquely weighted;
   for each type of non-instrumented object, normalizing the anomaly level for the respective type of non-instrumented object to a respective fixed scale, thus preventing key performance indicator-specific characteristics from influencing rankings of anomaly levels across non-instrumented components;
   calculating, by the processing device, a confidence score for the anomaly level based at least in part on the relationship between the non-instrumented object and the instrumented object and based at least in part on a relationship between the non-instrumented object and other instrumented objects, wherein the confidence score is further based at least in part on a number of the relationships between the non-instrumented object and other instrumented objects; and
   assigning the confidence score to the anomaly level assigned to the non-instrumented object.

\* \* \* \* \*